United States Patent [19]

Harpel et al.

[11] Patent Number: 4,564,464

[45] Date of Patent: Jan. 14, 1986

[54] HECTORITE BASED PAINT SPRAY BOOTH DETACKIFYING SLURRIES AND METHODS OF USE THEREOF

[75] Inventors: William L. Harpel, Langhorne; Deborah L. Purnell, Folsom; Richard J. Pilny, Warrington, all of Pa.

[73] Assignee: Betz Laboratories, Inc., Trevose, Pa.

[21] Appl. No.: 686,951

[22] Filed: Dec. 27, 1984

[51] Int. Cl.⁴ .................................. C02F 1/56
[52] U.S. Cl. ...................... 252/181; 55/84; 55/89; 134/13; 134/38; 210/712; 210/723; 210/728; 210/729; 252/175; 427/345; 427/421
[58] Field of Search ............. 55/84, 89; 134/13, 38; 210/712, 723, 728, 729; 252/175, 181; 427/345, 421

[56] References Cited

U.S. PATENT DOCUMENTS

| | | | |
|---|---|---|---|
| 2,267,426 | 12/1941 | Saunders et al. | 106/287 |
| 2,362,964 | 11/1944 | Affeck | 427/212 |
| 2,585,407 | 2/1952 | Rives | 106/213 |
| 3,429,823 | 2/1969 | Cataneo | 252/170 |
| 3,515,575 | 6/1970 | Arnold et al. | 106/210 |
| 4,125,476 | 11/1978 | Dean | 252/115 |
| 4,185,970 | 1/1980 | Dean | 55/89 |
| 4,220,456 | 9/1980 | Block | 55/85 |
| 4,380,495 | 4/1983 | Maher | 210/728 |
| 4,504,395 | 3/1985 | Harpel et al. | 210/712 |

Primary Examiner—Paul Lieberman
Assistant Examiner—Robert A. Wax
Attorney, Agent, or Firm—Alexander D. Ricci; Bruce E. Peacock

[57] ABSTRACT

Paint spray booth detackifying and clarification compositions and methods are disclosed. The compositions are pumpable, hectorite clay containing slurries. In addition to hectorite, which has been proven as a most effective detackifying agent, the slurries include thinning agents such as water soluble aliphatic and/or alicyclic amines. Water conditioning agents, such as water soluble polyphosphates are also made part of the slurry formulation.

3 Claims, No Drawings

HECTORITE BASED PAINT SPRAY BOOTH DETACKIFYING SLURRIES AND METHODS OF USE THEREOF

FIELD OF THE INVENTION

This invention relates to improved methods and compositions for treating Paint wastes and paint oversprays with hectorite clay material so as to effectively detackify the paint and facilitate easy collection thereof from paint water wash systems.

BACKGROUND

Spray painting of automobile bodies, truck engines, appliances, and other industrial goods is customarily carried out in enclosed areas called paint spray booths (PSB). These booths act both to contain any fumes or oversprayed paint and to reduce the chances of dust contamination. These booths vary in size, but are somewhat basic in their design and operation. A typical booth would thus consist of a work area, back section with mist eliminators, and a sump.

Tne units to be painted generally pass through the work area while an airflow makes the oversprayed paint contact either the sump water or the spray from the water curtain. The air is scrubbed with recirculated water at the water curtain, passes tnrough the mist eliminators, and is removed by an exhaust fan.

Because roughly one-half of all paint sprayed does not reach its intended article, a significant concentration of paint builds in the system and agglomeration can occur. The resultant mass is a sticky, tacky material which can plug the mist eliminators, shower heads, and even recirculating pumps. When this happens, scrubbing efficiency decreases leading to potentially hazardous conditions of unchecked paint emissions being discharged into the atmosphere. Such conditions may also present severe safety hazards to paint spray booth operators.

This process involves other problems. These tacky organic deposits are subject to bacterial growth and fungi proliferation which conditions generate corrosion and odor problems. In addition, the paint solids which are recirculated can form suspensions in the water. They remain tacky and can create expensive separation and disposal problems.

These problems show, therefore, the desirability to treat PSB water systems so as to reduce or prevent as much as possible, the agglomeration and deposition of oversprayed paint on critical PSB operation parts; to render the resultant sludge non-tacky and easily removable; and to provide a water quality such that it can be recycled for use in the system.

PRIOR ART

Many compositions and methods have been tried in an effort to reduce these problems. One of the first of these processes is disclosed in U.S. Pat. No. 2,585,407. This disclosure acknowledges the then conventional practice of allowing the overspray to come in contact with the water treated with caustic to a pH above 8. The paint eventually settles by gravity to the bottom of the sump where it is removed by shovelling the sticky residue from the sump. This method eventually was considered unacceptable and as a result, more sophisticated chemical treatments have been developed to separate the paint from the water and turn it into a non-tacky, or detackified, solid which does not cause the aforementioned problems.

The prior art is replete with such chemical treatment approaches. For instance, the use of a combination of esters of aliphatic dibasic acids and bentonite clay is suggested in U.S. Pat. No. 2,362,964 (Affeck). Similarly, U.S. Pat. No. 3,515,575 (Arnold et. al.) discloses the use of talc, chalk, starch, bentonite, clay, colloidal silica, calcium silicate, magnesium silicate, aluminum silicate, antifoams in general, and polycationic or polyanionic polymers to perform the detackification function.

Other prior art patents disclosing the use of bentonite clays in this environment include U.S. Pat. Nos. 4,220,456 (Block); 2,267,426 (Saunders et. al.); 4,185,970 (Dean); 4,125,476 (Dean); and 4,380,495 Maher).

In a major technological development, the use of hectorite clays has proven effective in treating varying paint types, and is especially efficacious in detackifying and clarifying paint waste suspensions generated by the use of the now popular "hi-solids" paints. Allowed U.S. patent application Ser. No. 577,905, now U.S. Pat. No. 4,504,395 (of common assignment herewith) details such hectorite use, and the present invention is seen as an improvement over the technology embodied therein.

Although the prior use of hectorite clay detackifying compositions and methods has proven effective, the heretofore available hectorite compositions were available in only a dry, powdered form. As such, the dry formulations had to be mixed with water before usage. Potential problems in pumping the slurry were created.

Accordingly, it was and is highly desirable to provide a low-viscosity hectorite containing slurry which can be easily shipped to the consumer in slurried state, and then can be readily pumped into the desired paint spray booth water system.

DETAILED DESCRIPTION

These and other problems inherent in the art have been alleviated by the specific hectorite containing slurries and methods of use thereof of the present invention.

As stated previously, hectorite has proven especially effective in detackifying and clarifying waste paint suspensions resulting from use of the so-called "high solids" paints. As used herein, sucn terminology will be used to denote those paints having solids contents (on a weight basis) of about 35% and greater.

Hectorite clay has been accorded the empirical formula:

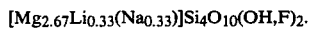

$$[Mg_{2.67}Li_{0.33}(Na_{0.33})]Si_4O_{10}(OH,F)_2.$$

Other details pertaining to the hectorite species may be gained from a reading of the aforementioned U.S. Pat. No. 4,504,395. The entire contents of said patent are herewith incorporated by reference.

One hectorite clay which may be used in accordance with the invention is sold under the trademark "Capritone H" by Capricorn Chemicals.

In order to effectively formulate the hectorite in slurry form, it became apparent that thinning agents were needed to reduce slurry viscosity so that the resulting slurry could remain in suspension (without substantial precipitation of the solids) over lengthy periods and so that the slurry could be easily pumped from its container to the desired use location.

Surprisingly, attempts at formulating the slurry with a well-known surfactant, i.e., Triton X-100 (an alkyl phenoxy polyethoxy ethanol compound) were found unsuccessful in that the surfactant did not decrease slurry viscosity sufficiently. Attempts were also made to incorporate polyacrylic acid into the slurry. Although this well-known polymer reduced slurry viscosity, it retarded the detackification efficacy of the resulting slurry.

Accordingly, the problem presented was to find an effective thinning agent for the slurry which did not substantially deteriorate the detackification and clarification properties of the hectorite. Such problem is thought alleviated by use of water soluble aliphatic and alicyclic amines as thinning agents. Exemplary amines include diethylentriamine, diethanolamine, tertiary butyl amine, isopropylamine, and aminoethylpiperazine. At present, it is preferred to use a combination of isopropylamine and aminoethylpiperazine as the thinning agent. These thinning agents effectively reduce slurry viscosity without substantially retarding detackification efficacy.

Although the amines effectively reduce the slurry viscosity, they are characterized by an unpleasant odor that would be repugnant to a paint spray booth operator. At the same time, it was desirable to incorporate a water conditioning agent into the mix to enhance slurry performance. We found that water soluble polyphosphate water conditioning agents also served to reduce slurry viscosity and since less of the amine could then be used, the noxious amine odor was substantially eliminated. Exemplary polyphosphates include sodium and potassium tripolyphosphate and tetrasodium or tetrapotassium pyrophosphate. Presently, tetrapotassium pyrophosphate is preferred.

To avoid foaming problems, traditional antifoams may be used if desired. Polyoxyalkylene glycol and silicone antifoams are well know in the art and may be used in accordance with the invention.

Other effective detackification agents such as montmorillonite clays, alumina, etc., may be incorporated into the slurry for economical reasons.

Compositions in accordance with the invention may comprise:
99.9%–10% nectorite
0.1%–20% thinning agents
0–10% water conditioning agent
0–15% alumina
0–40% montmorillonite clay
0–5% antifoam (All of the foregoing percentages are based on the total weight of the non-aqueous components of the slurry).

At present, the slurry composition preferred for use comprises:

| | | |
|---|---|---|
| 52.0% | hectorite | |
| 0.5% | aminoethylpiperazine | } thinning |
| 1.5% | isopropylamine | } agent |
| 5.0% | tetrapotassium pyrophosphate | |
| 39.0% | montmorillonite clay | |
| 2.0% | antifoam | |

(All of these percentages are based on the total weight of the non-aqueous components of the slurry).

Although various raw material addition and mixing procedures are satisfactory for the practice of this invention, the preferred approach is to first blend the hectorite, montmorillonite and antifoam. We have further found that retaining this blend for at least one day prior to mixing with the solution of water and the other ingredients is advantageous. This procedure yields a lower slurry viscosity than with alternative mixing approaches.

The hectorite containing slurry is either shot fed or continuously fed to the paint spray booth water system in an amount of about 0.5–50% by weight of the non-aqueous slurry components based on the weight of oversprayed paint. Most preferably, the slurry is added to the system at a rate of from about 1–20% by weight by non-aqueous slurry components to weight of oversprayed paint.

The following examples amply demonstrate that the slurry compositions of the present invention may be successfully utilized in processes of the type which are directed toward the inhibition of pollution and/or contamination in paint spray booth systems. In these types of water wash systems, the water is used to wash air in the booth and to remove oversprayed paints, enamels or lacquers. Solids may be removed by conventional techniques via filters, etc. The water is normally recirculated so that it may once again perform its intended washing function. Upon treatment with the slurry detackification compositions of the invention, the tackiness of the paints, enamels and lacquers is reduced and therefore, to the extent that these paints, enamels and lacquers are not separated from the liquid phase, they exhibit less tendency to adhere to the integral parts of the pumps, mist eliminators or sump sidewalls of the spray booths. Further, the agglomeration function of the slurry detackification compositions facilitates removal of these waste paint solids from the water so that relatively clean water can be recirculated in the system. Another important function of the treatment of the present invention is to reduce the volume of the resultant sludge.

The slurry detackification compositions can be admitted in the paint spray booth system at varied locations including: the sump, upstream from pumps, or at any advantageous position along the circulating water system.

The invention will now be further described with reference to a number of specific examples which are to be regarded solely as illustrative and not as restricting the scope of the invention.

EXAMPLES

In order to demonstrate the detackifying efficacy of the hectorite containing slurries of the present invention, jar tests were performed with paint samples collected from various automotive retailers. As a detackifying composition, the preferred composition was slurried with water so that the non-aqueous components accounted for 20% of the total slurry weight (including water). Then, 20% of the slurry (based on the weight of oversprayed paint) was used to treat the test paints. This means that the test paint was contacted by an amount of about 4% of the non-aqueous slurry components based upon oversprayed paint weight.

The following procedure was used:
1. Fill a 4-ounce bottle with 100 mL of untreated booth water if available.
2. Place a clean metal coupon in the bottle.
3. Add the treatment. Cap and shake.
4. Add 1 mL of paint dropwise, without coating the glass. Paint should be added above the water surface.
5. Cap and shake vigorously for 15–30 seconds and observe.

6. Evaluate the sample as follows:
   10-15 seconds after shaking
   a. Foam test—rate amount and stability of foam.
   b. Floc test—rate the paint floc size.
   c. Sink/float test—rate percentage sink/float.
   d. General appearance—detailed description of treated paint sludge.
   e. Coupon test—rate percent of paint adherence to the coupon.
   f. Detackification—rub paint sludge between two fingers and rate tackiness and consistency.

The following results were obtained:

| Table-Jar Test Results | |
|---|---|
| Paint Type | Comments |
| Grey Primer<br>66.8% solids<br>acetate-urea-formaldehyde-styrene = binder,<br>barium sulfate, talc, clay = pigment<br>acetate, cellosolve, mixed aromatics = solvent | non-continuous coating on jar walls, no smear on glass, oily, non-tacky, 2 mm float (mostly detackified paint sludge), 2 mm sink (mostly unused treatment) |
| Brown<br>51.4% solids<br>melamine-formaldehyde, styrenated polyurethane = binder<br>silicondioxide = pigment<br>methylketone-acetate ester solvent | non-continuous coating on walls, no smear on glass, oily, non-tacky, 2 mm float (mostly detackified paint sludge), 2 mm sink (mostly unused treatment) |
| Brown Top Coat<br>53.2% solids<br>melamine-formaldehyde alkyd, styrene = binder<br>iron oxide = pigment<br>ester, trace aromatic solvent | non-continuous coating on walls, no smear on glass, oily, non-tacky, 2 mm float (mostly detackified paint sludge), 2 mm sink (mostly unused treatment) |
| Clear Coat<br>34.0% solids<br>melamine-formaldehyde, alkyd resin, styrene = binder<br>no pigment<br>acetate, ester, methylketone solvent | non-continuous coating on walls, no smear on glass, oily, non-tacky, 2 mm float (mostly detackified paint sludge), 2 mm sink (mostly unused treatment) |
| Plum<br>40.8% solids<br>styrene, melamine, formaldehyde polyester = binder<br>organic pigment<br>mix aromatic, acetate, ketone = solvent | non-continuous coating, no smear on glass, light coat on finger, oily, non-tacky |
| Clear<br>57.2% solids<br>melamine/formaldehyde, styrenated polyester = binder<br>no pigment<br>methylketone, mix aromatic, cellosolve = solvent | non-continuous coating on glass, no smear on glass, light coat on finger, oily, non-tacky |
| Blue<br>69.8% = solids<br>melamine/formaldehyde and polyester with minor styrene = binder<br>metallic = pigment<br>methylketone = solvent | non-continuous coating on glass, no smear on glass, coat on finger, greasy, non-tacky |
| Turquoise<br>44.2% = solids<br>polyurethane, melamine/formaldehyde, styrene = binder<br>titanium dioxide = pigment,<br>cellosolve, acetate, trace methylketone solvent | non-continuous coating on glass, no smear on glass, greasy, non-tacky |

Discussion

From the jar tests, it is clear that this method of detackification is extremely effective. The non-continuous coating of the detackified paint on the jar walls is indicative of this. When the killed paint was pressed against the jar walls with a finger it did not smear. This is a further indication of excellent paint kill. Tacky or untreated paint feels wet and tacky when touched. With this treatment method the detackified paint is oily or greasy and non-tacky.

In the jar studies we also observed whether the detackified paint sludge tended to float or sink. In all of the tests run the "killed" paint sludge tended to float. This is desirable since most paint spray booth systems are designed for removal (e.g., by skimming) of a floating sludge.

Excess foam has also been a problem with some detackifier treatments. There were no apparent potential foam problems in these tests.

Laboratory Paint Spray Booth Study

In order to further demonstrate the efficacy of the slurry in accordance with the invention, it was tested in a lab scale paint spray booth.

The water in the test tank was maintained at 10 gallons with a recirculation rate of 8 gal/min. 360 mL of the test paints were sprayed at a rate of 0.5 gm/10 sec. 9,000 ppm of the preferred hectorite slurry. formulation (based on one million parts of water in the test system) was added to the system. This meant that the test paint was contacted by an amount of about 18.9% of the non-aqueous slurry components based upon oversprayed paint weight.

The following observations and conclusions were made:

Observations

1. When the hectorite containing slurry was added large globs and flakes formed that settled to the bottom of the lab PSB. The water became turbid.

2. After agitating and recirculating 10-15 minutes the water became very milky; the clay was totally dispersed.

Conclusions

Brown Paint—52.4% solids, melamine formaldehyde alkyd binder, organic pigment, cellosolve acetate solvent. The paint began to form a bubbly, even skin on the surface of the water. Tiny paint particles were visible in the water.

Green Paint—46.5% solids (other analyses same as Brown Paint immediately above). This paint also began to form a bubbly, even skin on the surface of the water. Tiny paint particles were visible in the water.

The rag of paint which formed on the surface of the water was very slightly tacky, but rollable on the hand and fingers.

Discussion

The results of this study showed a significant improvement over a previous study made with a different hectorite slurry (using a polyacrylic acid thinning agent) having the formula:
   polyacrylic acid—1.00%
   diethylaminoethanol—0.50%
   antifoam—0.47%
   alumina—1.82%
   montmorillonite—3.63%
   hectorite—12.69%
   water—79.89%

When this polyacrylic acid containing formulation was tested in the lab scale PSB, the resulting sludge was non-rollable and extremely tacky.

In accordance with the patent statutes, the best mode of practicing the invention has been herein set forth. However, it will be apparent to those skilled in the art that many modifications can be made without departing from the spirit of the invention, it is to be understood that the scope of the invention is to be limited solely by the scope of the appended claims.

We claim:

1. A pumpable slurry for the detackification and clarification of paint spray booth wastes comprising, in combination, from about 99.9%–10% of a hectorite clay material, from about 0.1–20% of a thinning agent, wherein said thinning agent comprises a member or members selected from the group consisting of water soluble aliphatic and alicyclic amines, about 0–10% of a water soluble polyphosphate water conditioning agent, from about 0 –15% alumina, from 0– about 40% montmorillonite clay, and about 0–5% of an antifoam, and water, all of said percentages being based upon the total weight of the non-aqueous components of said slurry.

2. A pumpable slurry as recited in claim 1 wherein said thinning agent comprises a member or members selected from the group consisting of isopropylamine and aminoethylpiperazine.

3. A slurry as recited in claim 1 wherein said hectorite is present in a percentage of about 52.0%, said thinning agent comprises about 0.5% aminoethylpiperazine and about 1.5% isopropylamine, said water soluble polyphosphate water conditioning agent comprises tetrapotassium pyrophosphate present in an amount of about 5.0%, said montmorillonite being present in an amount of about 39.0%, said antifoam comprising a polyoxyalkylene glycol present in an amount of about 2.0%, all of said percentages being based on the total weight of non-aqueous components of said slurry.

* * * * *